US011688395B2

(12) United States Patent
Thurimella

(10) Patent No.: US 11,688,395 B2
(45) Date of Patent: Jun. 27, 2023

(54) METHOD FOR OPERATING A VIRTUAL ASSISTANT FOR A MOTOR VEHICLE AND CORRESPONDING BACKEND SYSTEM

(71) Applicant: AUDI AG, Ingolstadt (DE)

(72) Inventor: Anil Thurimella, Munich (DE)

(73) Assignee: AUDI AG, Ingolstadt (DE)

( * ) Notice: Subject to any disclaimer, the term of this patent is extended or adjusted under 35 U.S.C. 154(b) by 772 days.

(21) Appl. No.: 16/561,832

(22) Filed: Sep. 5, 2019

(65) Prior Publication Data
US 2020/0079215 A1 Mar. 12, 2020

(30) Foreign Application Priority Data

Sep. 6, 2018 (EP) .................................. 18192840

(51) Int. Cl.
B60K 35/00 (2006.01)
G10L 15/22 (2006.01)
G06N 20/00 (2019.01)
B60R 16/037 (2006.01)
G06F 3/01 (2006.01)

(52) U.S. Cl.
CPC .......... *G10L 15/22* (2013.01); *B60R 16/0373* (2013.01); *G06F 3/016* (2013.01); *G06N 20/00* (2019.01); *B60K 2370/177* (2019.05); *G10L 2015/223* (2013.01)

(58) Field of Classification Search
CPC .. B60K 37/06; B60K 35/00; B60K 2370/148; B60K 2370/146; B60K 2370/161; B60K 2370/177; G10L 15/22; G10L 2015/223; G06N 20/00; G06N 3/006
See application file for complete search history.

(56) References Cited

U.S. PATENT DOCUMENTS

| 10,025,377 | B1 | 7/2018 | Bastide et al. |
| 10,585,470 | B2* | 3/2020 | Bastide .................. G06F 3/011 |
| 2010/0204984 | A1 | 8/2010 | Yang et al. |
| 2011/0246068 | A1* | 10/2011 | Luo .................... G01C 21/3407 |
| | | | 701/472 |

(Continued)

FOREIGN PATENT DOCUMENTS

| CN | 101119209 A | 2/2008 |
| CN | 106598215 A | 4/2017 |

(Continued)

OTHER PUBLICATIONS

Extended European Search Report for EP Application No. 18192840. 9.1012 dated Mar. 14, 2019.

(Continued)

*Primary Examiner* — Christopher E Leiby
(74) *Attorney, Agent, or Firm* — Staas & Halsey LLP

(57) ABSTRACT

An avatar interface of a virtual assistant is presented to a user in a motor vehicle and a predefined set of accessible elements is provided to be selected by the user. The accessible elements may be operating functions and/or information data. When at least one user statement of the user is received over the avatar interface; a question-answering logic is operated in the virtual assistant for determining at least one of the accessible elements that the user requests by the at least one user statement; and the at least one identified accessible element is made available to the user.

18 Claims, 1 Drawing Sheet

(56) References Cited

U.S. PATENT DOCUMENTS

| | | | |
|---|---|---|---|
| 2014/0218307 A1* | 8/2014 | Goldman-Shenhar | G06F 3/0485 345/173 |
| 2017/0160813 A1 | 6/2017 | Divakaran et al. | |
| 2017/0235361 A1* | 8/2017 | Rigazio | G10L 15/22 715/710 |
| 2017/0247000 A1* | 8/2017 | Ricci | B60R 16/037 |
| 2019/0187782 A1 | 6/2019 | Liu | |
| 2019/0205727 A1* | 7/2019 | Lin | G06N 5/00 |
| 2019/0251169 A1* | 8/2019 | Loghmani | G06F 40/295 |
| 2019/0378220 A1* | 12/2019 | Ibrahim | G06Q 20/18 |
| 2019/0392395 A1* | 12/2019 | Valliani | G06Q 10/109 |
| 2020/0223352 A1* | 7/2020 | Toshio Kimura | B60Q 1/549 |
| 2020/0258306 A1* | 8/2020 | Forutanpour | G01S 5/16 |
| 2021/0023945 A1* | 1/2021 | Xie | B60W 50/10 |
| 2021/0188090 A1* | 6/2021 | Kim | G06F 3/0482 |
| 2021/0275034 A1* | 9/2021 | Frank | A61B 5/0075 |
| 2021/0349433 A1* | 11/2021 | Zweig | G05B 19/0423 |

FOREIGN PATENT DOCUMENTS

| | | |
|---|---|---|
| DE | 102006049965 A1 | 10/2007 |
| DE | 102007007982 A1 | 10/2008 |
| DE | 102008028512 A1 | 12/2009 |
| EP | 18192840.9 | 9/2018 |

OTHER PUBLICATIONS

Chinese Office Action dated Aug. 26, 2022 for Chinese Application No. 201910830580.X.

* cited by examiner

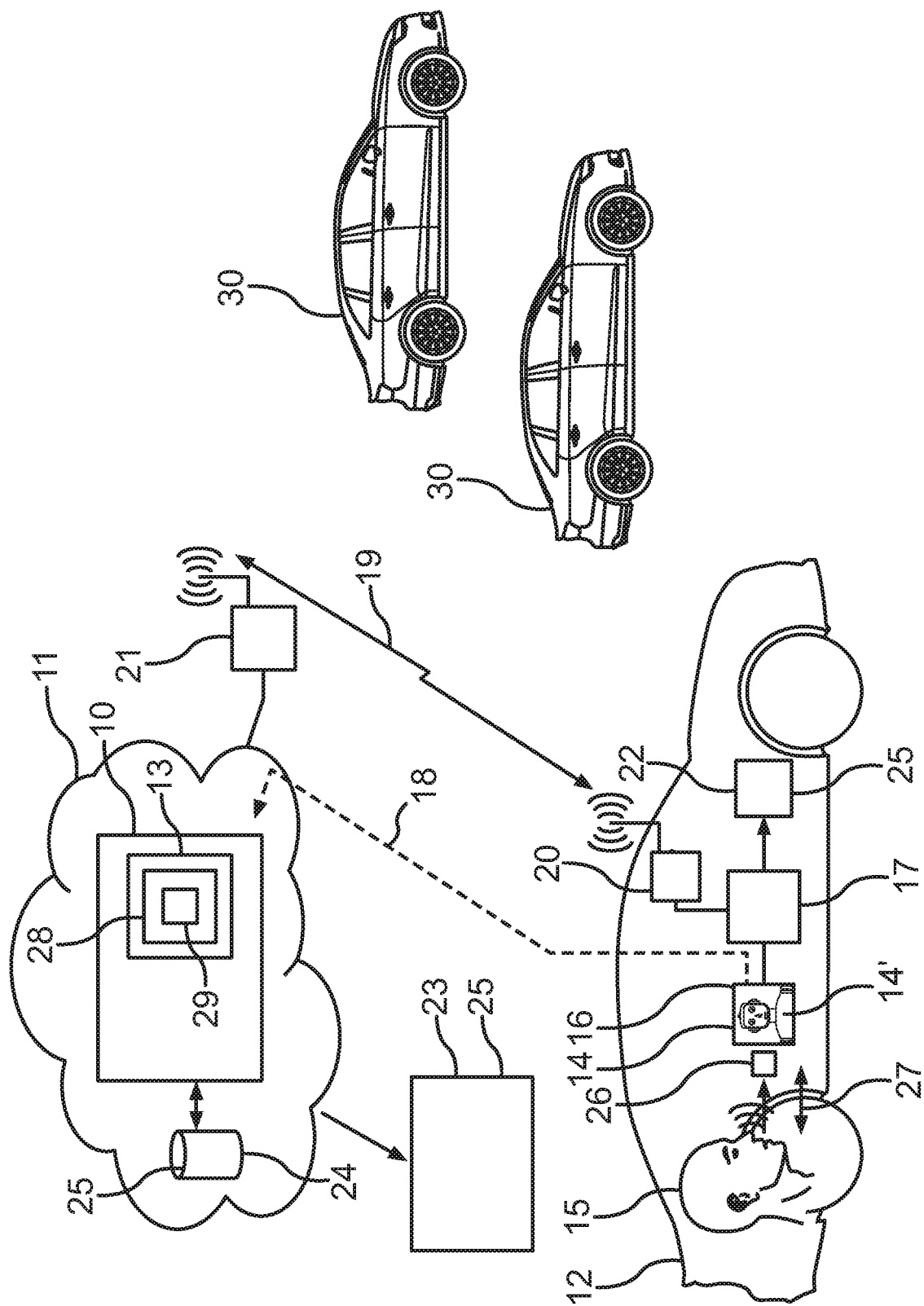

METHOD FOR OPERATING A VIRTUAL ASSISTANT FOR A MOTOR VEHICLE AND CORRESPONDING BACKEND SYSTEM

CROSS REFERENCE TO RELATED APPLICATIONS

This application claims priority of European Application No. 18192840.9 filed on Sep. 6, 2018, and incorporated by reference herein in its entirety.

BACKGROUND

Described below is a method for operating a virtual assistant for a motor vehicle. Such a virtual assistant may be presented in a motor vehicle in the form of a so called "avatar" (graphical representation of a face or an artificial head or a voice only). Also described below is a backend system that is designed for running or operating the virtual assistant in the motor vehicle from outside the motor vehicle.

A virtual assistant is described in the DE 10 2007 007 982 A1. If a user of a motor vehicle has a question regarding the usage of vehicle components, a video sequence may be started which shows the vehicle component in question together with a virtual person explaining the usage of that vehicle component.

Document DE 10 2008 028 512 A1 describes a communication system with a display unit. An avatar is displayed on the display unit. The behaviour of the avatar is modelled on the basis of a dialogue program that is designed to perform a natural-language-based dialogue with a user. A dialogue model has several dialogue-states between which the user can change by using natural language. By using fixed, predefined dialogue states it is difficult to adapt the avatar to the personal needs of the user.

Document DE 10 2006 049 965 A1 describes an interactive information system for providing information to a user of a vehicle. The system can be adapted to the needs of a specific user by a speech recognition system that detects the identity of the present user. The system also provides an avatar that is displayed on a touchscreen. The information provided is a predefined set of explanations regarding the vehicle. A flexible information retrieval system is not provided.

In particular, if a large amount of different information data and/or selectable functionalities is provided by a vehicle, it is difficult to provide an overview over these accessible elements (available information data and/or available functionalities) to a user by an avatar. Listing all accessible elements by a dialogue system and/or a menu would be too complex for a user to grasp.

Additionally, in the era of automated driving, extreme car sharing, electric cars, IOT/Edge computing a user may have access to huge amount of functions. It would be too much confusing what to call in which car. Therefore, AI (artificial intelligence) with virtual assistants/question answering would enhance the usability of the vehicle functionality.

SUMMARY

Described below is a virtual assistant for a motor vehicle that is able to adapt to the current situation in which a user is using the virtual assistant.

A virtual assistant for a motor vehicle can be presented in the motor vehicle by a graphical avatar and/or a voice-based avatar. This may be accomplished by the (graphical and/or a voice-based) avatar interface of the virtual assistant being presented to a user in the motor vehicle and, also, a predefined set of accessible elements is provided for selection by the user. The set of accessible elements includes operating functions and/or information data. In other words, an accessible element can be a function that may be activated by the user. Additionally or alternatively an accessible element may be a piece of information, i.e. information data, that the user may access. The elements are referred here as "accessible" in the sense that they are available or selectable by the user. For retrieving such an accessible element, the user may use the virtual assistant. This is done by interacting with the avatar interface in that at least one user statement of the user is received over the avatar interface.

The problem with accessing the accessible elements can now be, that their number is large (more than 50 or more than 100), such that the user does not have an overview which elements are available. In other words, the user may not be able to simply state: "Activate accessible element X!". The user might not know that there is an accessible element X. Instead, the user has to find out or investigate which accessible elements are available and/or which accessible elements are suitable for the current situation and/or the current need of the user.

Therefore, a question-answering logic is operated in the virtual assistant for determining at least one of the accessible elements that the user requests by the at least one question. The user may therefore state a statement or more than one statement. Such a statement can be a question ("Can you make it more comfortable?") and/or a command ("Make the passenger cabin more comfortable!") and/or a declaration ("It is very uncomfortable in here.").

From statement to statement, the question-answering logic may narrow down the set of possible accessible elements that might fit the users need and/or the current situation. For example, in the above-described exemplary situation, the user's statement might be answered by the virtual assistant: "Do you mean the temperature or the air-flow?" for determining whether the heating should be turned on or the ventilation should be changed. The question-answering logic may be based on the so-called "question answering" (QA) which is a computer science discipline within the fields of information retrieval and natural language processing (NLP), which is concerned with building systems that automatically answer questions posed by humans in a natural language. Additionally or alternatively, the question-answering logic may be based on the so called game theory, as is known from the related art.

The question-answering logic of the virtual assistant is implemented on the basis of a machine learning engine. In other words, the question-answering logic is not static, but instead it is dynamic or self-adapting. The question-answering logic may therefore "learn" or train or store a relation between the at least one statement stated by the user and the resulting at least one accessible element that the user actually meant or was aiming at. The next time the user starts stating the at least one statement, the machine learning engine will be able to select or determine the at least one accessible element with less questions or statements as the machine learning engine will have learned or trained which at least one accessible element the user is referring to.

Finally the at least one identified accessible element that has been identified by question-answering logic is made available to the user. In other words, at least one specific function may be operated and/or specific information data may be provided. They are specific in the sense that they fit to the at least one statement stated by the user. In the above-described example, the heating might be identified as the suitable accessible element. The heating may then be turned on.

The question-answering logic may be based on a computer program as it is available in the related art for controlling the flow of a dialogue in a digital dialogue system. However, the method uses a question-answering logic that is adaptable or dynamic owing to the machine learning engine. This machine learning engine may be based on a computer program. The machine learning engine may be implemented in the form of an artificial neural network.

The method described herein provides the advantage that a large number accessible elements (more than 50 or more than 100) may be made accessible to the user without the need of explaining or listing all accessible elements to the user for making them selectable or accessible. Instead, the user may ask at least one question or more generally state at least one statement and from the at least one statement the virtual assistant may derive or determine which at least one accessible element is most suitable for the user in the current situation and/or for the users current need as expressed by the at least one statement. Additionally, the underlying question-answering logic is able to adapt to the user, i.e. to the way the user expresses the current situation and/or the current need by the at least one statement. This allows for adapting the question-answering logic to the specific characteristics of the user. The next time the user is in a similar or same situation and/or has a similar or the same need, the question-answering logic will be enabled to determine the same at least one accessible element with less statement needed. In the above-described example, the virtual assistant might associate the statement "It is very uncomfortable in here" with turning on of the heating.

In one embodiment, the at least one question-answering logic is personalized with respect to the user by the machine learning engine. In other words, the specific way, how the user expresses or formulates the at least one statement is trained into or learned by the machine learning engine. This provides the advantage that, if the user states or one or several statements and the question-answering logic selects an unwanted or wrong accessible element (e.g. opening a window), the user may correct the selection by stating at least one correcting statement (e.g. "I meant the heating.") and the question-answering logic will not repeat the error again. This first wrong interpretation of the initial statement or statements can be corrected for example by a so called supervised and/or unsupervised learning method. If the user states the same initial statement or statements again, the question-answering logic will then select the at least one accessible element that the user selected by the at least one correcting statement.

In one embodiment, the personalization is implemented on the basis of a reinforcement learning. In other words, whenever the question-answering logic selects a wrong accessible element on the basis of the at least one statement stated so far by the user and the user indicates that the selection is wrong (by at least one correcting statement), this is used as a signal for adapting the machine learning engine. This provides the advantage that a direct improvement of the machine learning engine is available whenever the selection of the at least one accessible element is wrong.

At least a part of the accessible elements may be implemented and/or stored in the vehicle. However, in one embodiment the accessible elements include at least one operating function that is a respective external function that is implemented outside the motor vehicle. In other words, the virtual assistant is not only suitable for controlling or operating the motor vehicle, but also at least one external function outside the vehicle may be controlled by the virtual assistant.

In one embodiment the at least one external function is located in a home automation cloud and/or in a smart city platform and/or an internet-of-things controlling system. In other words, the user may control at least one home automation component (e.g. lights in a house and/or a heating system of the house) and/or a smart city component (e.g. a meter of a car park and/or a parking place administration system) and/or a component of the internet-of-things (IOT; e.g. a camera and/or an actuator).

In one embodiment the virtual assistant receives planning data from the user wherein the planning data describe at least one activity and/or service that the virtual assistant is to perform during a future time interval. In other words, the user states what he wants the virtual assistant to do in the future time interval, for example during an upcoming trip with the motor vehicle. The virtual assistant then acts in the motor vehicle according to the planning data. For example, the user may state that the virtual assistant shall take at least one photograph with a vehicle camera while the vehicle is passing by a specific point of interest, for example a mountain or a building. Later in the future time interval, when the vehicle is passing by the point of interest, the virtual assistant will generate the at least one photograph without the user giving a further command. This provides the advantage that the activity of the virtual assistant may be pre-programmed. Another activity can be, e.g. that the virtual assistant shall remind the user of a specific fact, for example the need of taking a specific medicine, at a specific point in time. The virtual assistant then acts as a reminder.

In one embodiment, the avatar interface receives and/or processes the at least one user statement on the basis of natural language recognition and/or gesture recognition and/or facial pose recognition and/or a virtual and/or augmented reality presentation. A natural language recognition enables the virtual assistant to recognize or understand a statement that the user formulates without following a specific technical protocol (e.g. a statement using when-then-formulations). The user may state the situation or need in a natural language, like the user would talk to another person. A gesture recognition allows to consider a gesture of the user when interpreting the statement. For example, the user may state the question "What is this?" and point to a specific object. The question-answering logic may then retrieve an accessible element in the form of information data about the object the user is pointing at. The interpretation of a facial pose of the user enables the question-answering logic to interpret or recognize an emotion of the user. This may help interpreting or detecting whether the question-answering logic has correctly interpreted the at least one statement of the user. For example, when the at least one accessible object that the virtual assistant has selected for the user is finally presented to the user, the facial expression may be used to detect whether the selection has been correct or not. A virtual and/or augmented reality representation may enable the virtual assistant to present output independently of the surrounding conditions.

In one embodiment, a configuration of the virtual assistant is transferrable between or usable from different motor vehicles. In other words, the user may be presented the same avatar interface (based on the same machine learning engine) in different vehicles such that there is no need for the user to adapt to the virtual assistant when changing between motor vehicles.

In one embodiment, a task begun in one motor vehicle is continued in another motor vehicle. Here, a task is a combination of the at least one statement and the search for the corresponding at least one accessible element. Thus, the user may start stating the at least one statement in one vehicle and may continue stating the at least one statement in another vehicle. This virtual assistant will still be able to consider all statements for deriving or selecting the at least one accessible element that the user is referring to by the at least one statement.

For operating or implementing the virtual assistant, the backend system has at least one processing unit. Such a backend system may be implemented as a cloud server system or as an internet server system. The at least one processing unit of the backend system is designed to perform an embodiment of the method. The processing unit may include at least one microprocessor and/or at least one micro controller. The processing unit may have at least one program module with computer readable instructions that will perform the method when executed by the processing unit. The at least one program module may be stored in a data storage of the processing unit.

BRIEF DESCRIPTION OF THE DRAWINGS

These and other aspects and advantages will become more apparent and more readily appreciated from the following description of the exemplary embodiment, taken in conjunction with the accompanying drawing.

The single drawing illustrates a backend system linked to at least one motor vehicle for presenting a virtual assistant in each motor vehicle.

DETAILED DESCRIPTION OF THE PREFERRED EMBODIMENT

In the embodiment explained in the following, the described components of the embodiment each represent individual features which are to be considered independently of each other and thereby are also to be regarded as a component in individual manner or in another combination than the described combination. Furthermore, the described embodiment can also be supplemented by further features already described.

In the FIGURE identical reference symbols indicate elements that provide the same function.

The FIGURE illustrates a backend system 10 that may be based on at least one internet server or a cloud server or a fog computing structure. The backend system 10 may be operated in the internet 11. The FIG. also shows a vehicle 12 which can be a motor vehicle, e.g. a passenger vehicle or a truck. The backend system 10 may operate a software for providing a virtual assistant 13. An avatar interface 14 for interacting with a user 15 in vehicle 12 may be controlled or operated by the virtual assistant 13. For example, the avatar interface may be implemented on the basis of a display 16 on which a virtual character 14' may be presented or animated as the avatar interface 14. For operating the avatar interface an electronic control unit 17 of vehicle 12 may be provided. The avatar interface 14 and the virtual assistant 13 in backend system 10 may be interconnected by a communication link 18 which may be based on a wireless link 19. The wireless link 19 may be provided by a communication unit 20 of vehicle 12 and a communication device 21. Communication unit 20 can be based on a mobile radio device (e.g. 4G or 5G) and/or a WIFI module. Accordingly, the communication device 21 may include a radio network and/or a WIFI network.

Using the virtual assistant 13, the user 15 may control a vehicle component 22 and/or an external component 23. Additionally or alternatively, user 15 may access an information source 24 via the virtual assistant 13. The vehicle component 22 may be for example an infotainment system and/or an acclimatization system and/or a media playback system. The external component 23 can be part of e.g. a home automation cloud and/or a smart city platform and/or an internet of things. The information source 24 can include at least one data server of internet 11 and/or a database. The vehicle component 22, the external component 23 and the data source 24 constitute a respective accessible element 25 which is accessible for the user 15 using the virtual assistant 13.

For accessing such an accessible element 25, user 15 may state at least one statement 26, e.g. a question or a command, to the avatar interface 14. The at least one statement 26 may be stated to the avatar interface 14 on the basis of a dialogue 27 which may be coordinated by the virtual assistant 13. The virtual assistant 13 may operate a question-answering logic 28 for coordinating or leading the dialogue 27. The question-answering logic 28 may be based on a machine learning engine 29, e.g. an artificial neural network. The question-answering logic 28 enables user 15 to find out which accessible elements 25 are available and/or to indirectly describe what the virtual assistant 13 shall do for user 15 and the virtual assistant 13 will then select an appropriate or matching at least one accessible element 25. For example, the user may state at the first statement 26: "I feel uncomfortable." The virtual assistant 13 may then continue dialogue 27 by asking for example: "Is it the temperature or the shape of the seat?". The user may then be motivated to utter another statement 26: "I feel cold.". The virtual assistant 13 may than derive that an activation of a vehicle component 22 for heating the vehicle 12 may be an appropriate solution or accessible element that should be activated for user 15 considering the at least one statement 26 of user 15.

The virtual assistant 13 may also be linked to further vehicles 30. The vehicles 30 may be equipped in the same way as vehicle 12. When user 15 changes from vehicle 12 to one of vehicles 30, the same avatar interface 14 may be presented to user 15. User 15 may even be enabled to continue a specific task of finding a specific accessible element 25. In other words, user 15 may start stating at least one statement 26 in vehicle 12 and may then continue with stating at least one statement 26 in another vehicle 30 and the virtual assistant 13 may still be able to consider all statements 26 for finding or selecting an appropriate accessible element 25.

The dialogue 27 may be designed to use, e.g., predefined questions that may enable question-answering logic 28 to derive at least one accessible element 25 matching the at least one statement 26 that user 15 stated for identifying an accessible element that he is looking for.

An embodiment is described below.

The underlying idea therefore is to introduce a virtual assistant within the car (motor vehicle) and the virtual assistant based on VR/AR (Virtual Reality/Augmented Reality) so that the car user interacts with the assistant to accomplish at least one of the following tasks:

access and run any functions on the vehicle.
have a personalized interaction in an arbitrary way (language, accent, gesture) as well as have an arbitrary/ customizable representation of the assistant, interact about an arbitrary topic (e.g. question asking).

perform an allowed function of system connected to the vehicle/backend.

The rationale for adding the virtual assistant is the automotive technologies would be too complex to be presented on the current interaction technologies. The virtual assistant is be able to guide the user for selecting appropriate functions/sub-functions or other accessible elements (e.g. making an online software update).

Virtual assistants can provide additional value to the luxury cars in the era of automated vehicles because the users of luxury cars would be able to enjoy the services from the assistants.

Virtual assistants are able to learn from the users based on machine learning. Based on this, the users would be able to have personalized interaction with the assistants in arbitrary language and gesture. This would provide natural interaction with the users as well as provide possibility to add emotions.

The user is able to plan a set of activities/services that may be performed within a car during his travel (e.g. similar to flight attendants). E.g. Assistant asks the user to take medicines at a particular time, assistant takes photographs while driving through Alps, assistant wakeups the user at 6 AM. The user may configure the virtual assistant representation based his interests.

The user may be provided access to the related systems such as smart homes, smart cities to perform appropriate actions from his car. For example, sitting in a car he can ask the virtual assistant to start AC at home five minutes before arrival.

By collecting data with time on a user as well as set of users, the performance and the quality of the virtual assistants improves with time. Based on the virtualization, the physical components for the user interaction will be reduced significantly.

The technical realization of the approach includes the following additions in the vehicle and the automotive backend environment:

VR and AR based control device is added to the vehicle to present the virtualization. A virtual agent/virtual assistant engine and a machine learning are added to control the virtual assistant, its inputs and outputs as well as learning. A camera-based system and speech engine are added to identify user inputs. A comprehensive deep learning engine is provided in the backend to optimize and update the functionality of the virtual assistant.

The automotive backend adds integrations to backends of the related systems such as smart home, smart cities, hospitals.

Overall the idea is to add AI (artificial intelligence, machine learning) in a virtual assistant. The following capabilities may then be provided:

1. Question answering (interact about an arbitrary topic (e.g. question asking)). A car user may ask an arbitrary question to the virtual assistant. The assistant would use machine learning/AI techniques to answer the questions by accessing data from the related environments such as internet, smart homes.

In a vehicle a data center may be accessible without the need to explain all accessible elements. The vehicle itself would be related to many other systems such as automotive backend, internet, smart homes. Without such AI guided concepts it would be difficult to present large scale data to humans.

Using AI interaction between the human and the virtual agent may be improved/optimized at a person level.

The IOT/AI approach from the virtual assistant can support to monitor and support functions remotely from the connected systems such as smart homes (switching on AC at home, reporting status of a relative at the hospital).

In addition to the above, the also provides the following advantages:

It adds flexibility on inputs and outputs. For example, the idea may get input from an arbitrary way (e.g. natural language, gesture+facial pose, VR) and also get the output (e.g. natural language, gesture+facial pose, VR) in arbitrary way from the virtual assistant.

Furthermore, based on the backed system and personalization 1) the same virtual agent and 2) the learning continuity may be maintained in an arbitrary vehicle (i.e. several vehicles).

If the driving is automated, the user of a vehicle gets possibility to use the travel time by performing operations on the related systems. The interaction would be completely different.

Overall, the example shows how an in-car virtual assistant may be provided by the invention.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

What is claimed is:

1. A method for operating a virtual assistant for a motor vehicle, comprising:
   presenting an avatar interface of the virtual assistant to a user in the motor vehicle;
   storing a predefined set of accessible elements to the user, the set of accessible elements including operating functions of the motor vehicle and information about the operating functions;
   receiving at least one user response from the user in response to at least one question from the avatar interface;
   processing the at least one user response, by a question-answering logic implemented using a machine learning engine in the virtual assistant, to determine at least one of the accessible elements requested by the user response; and
   controlling at least one of the operating functions of the motor vehicle for the user by the virtual assistant based on said processing of the at least one user response.

2. The method according to claim 1, further comprising personalizing the question-answering logic with respect to the user by the machine learning engine.

3. The method according to claim 2, wherein the personalizing of the question-answering logic uses reinforcement learning.

4. The method according to claim 1,
   further comprising receiving, by the virtual assistant, planning data from the user, the planning data describing when and what the virtual assistant is to perform during a future time interval, and
   wherein said controlling of the at least one of the operating functions of the motor vehicle is performed according to the planning data.

5. The method according to claim 4, wherein the receiving of the at least one user response by the avatar interface uses at least one of facial pose recognition, a virtual reality presentation and an augmented reality presentation.

6. The method according to claim 5, further comprising configuring the virtual assistant for one of a plurality of different motor vehicles.

7. The method according to claim 6, further comprising continuing, by the virtual assistant, said processing of the at least one user response, by the question-answering logic implemented using the machine learning engine, begun in the motor vehicle in another motor vehicle.

8. The method according to claim 1, wherein the receiving of the at least one user response by the avatar interface uses at least one of natural facial pose recognition, a virtual reality presentation and an augmented reality presentation.

9. The method according to claim 1, further comprising configuring the virtual assistant for one of a plurality of different motor vehicles.

10. The method according to claim 1, further comprising continuing, by the virtual assistant, said processing of the at least one user response, by the question-answering logic implemented using the machine learning engine, begun in the motor vehicle in another motor vehicle.

11. The method according to claim 4, wherein said controlling controls a camera to capture an image outside the motor vehicle during the future time interval.

12. The method according to claim 1, wherein the at least one of the operating functions of the motor vehicle includes control of a camera to capture an image outside the motor vehicle.

13. A backend system for a virtual assistant of a motor vehicle, comprising:
 a memory storing a predefined set of accessible elements, including at least one of operating functions of the motor vehicle and information about the operating functions;
 a communication interface wirelessly communicating with the motor vehicle; and
 at least one processing unit configured to
  present an avatar interface of the virtual assistant to a user in the motor vehicle; and
  receive at least one user response from the user via the avatar interface;
  process the at least one user response, by a question-answering logic implemented using a machine learning engine in the virtual assistant, to determine at least one of the accessible elements requested by the at least one user response; and
  perform at least one of the operating functions of the motor vehicle for the user by the virtual assistant based on processing of the at least one user response.

14. The backend system according to claim 13, wherein the at least one processing unit is further configured to personalize the question-answering logic with respect to the user by reinforcement learning in the machine learning engine.

15. The backend system according to claim 13, wherein the at least one processing unit is further configured to receive the at least one user response by the avatar interface using at least one of facial pose recognition, a virtual reality presentation and an augmented reality presentation.

16. The backend system according to claim 13, wherein the at least one processing unit is further configured to continue in another motor vehicle, processing of the at least one user response by the question-answering logic, begun in the motor vehicle.

17. The backend system according to claim 13, wherein the at least one of the operating functions of the motor vehicle includes control of a camera to capture an image outside the motor vehicle.

18. The backend system according to claim 17, wherein the at least one user response includes planning data describing when the camera is activated.

* * * * *